US010355555B2

(12) United States Patent
Kocevar et al.

(10) Patent No.: US 10,355,555 B2
(45) Date of Patent: Jul. 16, 2019

(54) ELECTRIC MACHINE (71) Applicant: Mahle International GmbH, Stuttgart (DE)

(72) Inventors: Mitja Kocevar, Ajdovscina (SI); Darjo Pavsic, Dobrovo (SI)

(73) Assignee: Mahle International GmbH (DE)

(*) Notice: Subject to any disclaimer, the term of this patent is extended or adjusted under 35 U.S.C. 154(b) by 252 days.

(21) Appl. No.: 15/192,558

(22) Filed: Jun. 24, 2016

(65) Prior Publication Data
US 2016/0380508 A1 Dec. 29, 2016

(30) Foreign Application Priority Data

Jun. 26, 2015 (EP) .................................... 15174089
Sep. 18, 2015 (EP) .................................... 15185788

(51) Int. Cl.
H02K 7/08 (2006.01)
F16J 15/44 (2006.01)
(Continued)

(52) U.S. Cl.
CPC ............ *H02K 7/083* (2013.01); *B60L 1/003* (2013.01); *F16C 33/80* (2013.01); *F16J 15/4476* (2013.01); *H02K 5/161* (2013.01); *H02K 5/1732* (2013.01); *H02K 7/1008* (2013.01); *F16C 19/06* (2013.01); *F16C 35/067* (2013.01); *F16C 2380/26* (2013.01); *H02K 7/1004* (2013.01); *H02K 9/06* (2013.01); *H02K 2213/03* (2013.01)

(58) Field of Classification Search
CPC ........ F16C 33/80; F16C 35/067; F16C 19/06; F16C 2380/26; F16J 15/4476; H02K 5/1732; H02K 5/161; H02K 7/083; H02K 7/1008; H02K 7/1004; H02K 9/06; H02K 2213/03

USPC .......................................................... 310/90
See application file for complete search history.

(56) References Cited

U.S. PATENT DOCUMENTS 3,214,618 A 10/1965 Jaeschke
4,373,759 A * 2/1983 Greener ................ B65G 39/09
384/480
2015/0123517 A1 5/2015 Kaneko

FOREIGN PATENT DOCUMENTS

EP 2538527 A1 12/2012
FR 2620876 A1 3/1989
(Continued)

OTHER PUBLICATIONS

European Office Action dated Apr. 27, 2018 for Application No. 15 185 788.5.

(Continued)

Primary Examiner — Burton S Mullins
(74) Attorney, Agent, or Firm — Fishman Stewart PLLC (57) ABSTRACT An electric machine may include a housing, a stator arranged in the housing, and a rotor arranged in the stator and mounted on the housing so as to be rotatable about an axis of rotation. The rotor may have a rotor shaft, which may be led out through a front wall of the housing. The rotor shaft may have, on an outer side of the front wall, a drive element, which serves for transmission of torque between the rotor and a drivetrain. The rotor shaft may be rotatably mounted in a front bearing, which is inserted into the front wall. The front bearing may be, at an inner side of the front wall, sealed off with respect to an interior of the housing by way of a labyrinth seal.

20 Claims, 7 Drawing Sheets (51) Int. Cl.
*F16C 19/06* (2006.01)
*F16C 33/80* (2006.01)
*F16J 15/447* (2006.01)
*H02K 5/173* (2006.01)
*B60L 1/00* (2006.01)
*H02K 5/16* (2006.01)
*H02K 7/10* (2006.01)
*F16C 35/067* (2006.01)
*H02K 9/06* (2006.01)

(56) References Cited

FOREIGN PATENT DOCUMENTS

GB 2268546 A 1/1994
WO 2008116884 A1 10/2008

OTHER PUBLICATIONS

Eng. abstract of EP 2538527.
Eng. abstract of FR 2620876.

* cited by examiner

ELECTRIC MACHINE

CROSS-REFERENCE TO RELATED APPLICATIONS

This application claims priority to European Patent Application No. 15174089.1, filed Jun. 26, 2015, and European Patent Application No. 15185788.5, filed Sep. 18, 2015, the contents of which are hereby incorporated by reference in its entirety.

TECHNICAL FIELD

The present invention relates to an electric machine having a housing, having a stator which is arranged in the housing and which is fixed with respect to the housing, and having a rotor which is arranged in the stator and which is mounted on the housing so as to be rotatable about an axis of rotation.

BACKGROUND

An electric machine of said type may basically be designed as an electric motor or as a generator. It is in the present case preferably a generator which is used with an internal combustion engine, in particular in a motor vehicle, and which is normally referred to there as an alternator. The generator is particularly advantageously designed as a claw pole generator. In the case of a claw pole generator of said type, a front claw body and a rear claw body are mounted on a rotor shaft on both sides of a rotor winding, in such a way that the pole claws of the front claw body and pole claws of the rear claw body alternate in the circumferential direction and thus form electromagnetic poles which alternate with one another during the operation of the generator.

In the case of an electric machine of said type, the rotor has a rotor shaft which is led out through a front wall of the housing, wherein the rotor shaft has, at an outer side of the front wall, a drive element which serves for transmission of torque between the rotor and a drivetrain when the electric machine is incorporated into the drivetrain. In the case of the electric machine being used as a generator on an internal combustion engine, the generator is expediently incorporated into a belt drive of the internal combustion engine, such that the drive element is then a belt pulley which engages with a belt of the belt drive. Other configurations are basically also conceivable, however.

The electric machine may for example be incorporated into a chain drive. The drive element is then a gearwheel which then engages with a chain of the chain drive.

The rotor shaft is expediently rotatably mounted in a front bearing which is inserted into the front wall. Said front bearing, which is expediently a rolling body-type bearing, in particular a ball bearing, is subject to increased risk of contamination specifically if the electric machine is used in the region of an internal combustion engine, in particular in a motor vehicle. Contamination of the front bearing can however increase the friction in the front bearing, and intensify abrasion and thus also wear of the front bearing. In this case, it has been found that there is also a risk of contamination from an interior of the housing, in particular if a cooling air flow flows through the housing. A cooling air flow of said type may introduce contaminants from the surroundings of the electric machine into the interior of the housing. From there, the contaminants can pass between a rotor body of the rotor and an inner side of the front wall to the front bearing, and contaminate the latter. Such impurities comprise particles and liquids and suspensions and the like. Here, the contaminants may be composed of different materials. In the case of the electric machine being used in the region of an internal combustion engine, a high proportion of such contaminants is formed by fluids which are used in conjunction with the internal combustion engine and which pass into the surroundings as a result of leakages.

Whereas the front bearing can be protected relatively effectively by way of conventional seals at the outer side of the front wall, merely conventional seals generally cannot be used at the inner side owing to the hard operating conditions prevailing there.

SUMMARY

The present invention is concerned with the problem of specifying, for an electric machine of the type described above, an improved embodiment which is distinguished by improved protection of the front bearing against contaminants.

Said problem is solved according to the invention by way of the subject matter of the independent claims. The dependent claims relate to advantageous embodiments.

The invention is based on the general concept that the front bearing is, at an inner side of the front wall, sealed off with respect to an interior of the housing by way of a labyrinth seal. A labyrinth seal of said type generally operates in contactless fashion. In this way, a seal element fixed to the rotor and a seal element fixed to the housing can exhibit relatively high rotational speeds relative to one another without wear occurring as a result. Furthermore, such seal elements can particularly easily be produced from heat-resistant materials as they do not need to be designed with regard to friction and/or contact sealing. In particular, seal elements of a labyrinth seal of said type do not need to be produced from a conventional seal material, which is generally a relatively soft and temperature-sensitive plastic. A labyrinth seal utilizes the principle of a throttling gap, which is made as long as possible by the labyrinth structure, whereby an efficient sealing action can be realized.

If the labyrinth seal operates contactlessly, it has at least one seal element fixed to the rotor and at least one seal element fixed to the housing, wherein said seal elements are arranged relative to one another such that each seal element fixed to the rotor does not make contact with any seal element fixed to the housing.

In an advantageous embodiment, the labyrinth seal may have an annular groove which is arranged on the rotor shaft and which is radially open. Furthermore, the labyrinth seal may have a holding plate which is arranged on the inner side of the front wall and which has an inwardly protruding annular collar, wherein said annular collar axially overlaps, preferably fully overlaps, the annular groove, wherein an inner annular gap is formed between a surface in which the annular groove is situated and the annular collar. In this way, a labyrinth seal is realized which is of particularly simple design and which is distinguished by an adequate sealing action. Here, by way of the annular groove, a two-stage gap seal is realized within the labyrinth seal, wherein the first seal stage is formed between the annular collar and a surface section which delimits the annular groove axially at one side, whereas the second seal stage is formed between the annular collar and a surface section which delimits the annular groove axially at the other side.

The holding plate may have a ring shaped body arranged in such a way that an air gap insulation is provided axially between the front bearing and the annular body of the holding plate. To this end, the holding plate provides an axial gap between itself and the front bearing and a front wall of the casing apart from at least one fixation point by which the holding plate is fixed to said front wall. Apart from the respective fixation point the holding plate preferably has no contact with the front bearing and the front wall. Optionally, said body of the holding plate extends radially over the whole front bearing and operates as a heat shield. Said front wall supports the front bearing.

In an advantageous refinement, the annular groove may be formed in a sealing ring which, as a separate component, is mounted onto the rotor shaft. The abovementioned surface in which the annular groove is situated is then formed by the surface of the sealing ring. The sealing ring is expediently composed of metal.

In another refinement, the holding plate may form a means for axially fixing the front bearing to the front wall. In this way, the holding plate performs a dual function. For example, the front wall may have, on the inner side, a cutout or receptacle into which the front bearing is axially inserted. The holding plate is then fastened to the inner side of the front wall so as to protrude radially beyond said bearing receptacle and thus, by way of a form fit, axially fix the front bearing inserted therein.

In another advantageous refinement, the labyrinth seal may have at least one annularly encircling flange which is arranged on the rotor and which protrudes outwardly, that is to say in the direction of the front wall. Said flange is now expediently designed so as to axially overlap the annular collar, at a side averted from the annular groove, over a length, such that an overlap with an axial length is thus realized. An outer annular gap is now formed between said flange and the annular collar. The labyrinth seal is significantly improved by way of a flange of said type. In particular, the flow path through the labyrinth seal from the interior to the front bearing is greatly lengthened by way of the respective flange, which considerably improves the efficiency of the labyrinth seal owing to the throttling gap action. What is preferred is the embodiment described above, in which the flange is arranged such that the annular collar is arranged radially between the flange and the annular groove.

In one refinement, the outer annular gap may be larger than the inner annular gap. In particular, the outer annular gap may be at least twice as large as the inner annular gap. It has been found that the outer annular gap may have a greater gap width than the inner annular gap in order to nevertheless realize the desired efficient seal action. This is attributed to the higher circumferential speeds during the operation of the electric machine. It may furthermore be provided that the outer annular gap is smaller than a wall thickness of the annular collar. This coordination also leads to an improved seal action. The gap width of the respective annular gap is in this case measured in the radial direction in relation to the axis of rotation. Here, the axial direction is defined by the axis of rotation, such that the axial direction runs parallel to the axis of rotation.

In another refinement, the length of the overlap may be larger than a wall thickness of the annular collar. In addition or alternatively, it may be provided that the length of the overlap is at least equal to an axial width of the annular groove. The coordination of the length of the overlap with the wall thickness of the annular collar and/or with the axial width of the annular groove leads to an improved seal action.

In another advantageous embodiment, the rotor may have, on a front side facing toward the front wall, a front fan impeller fixed to the rotor. The abovementioned flange may then be formed on said front fan impeller. Here, an embodiment is particular advantageous in which the flange is formed integrally on the front fan impeller. In this way, the fan impeller performs an additional function, such that said flange can be realized without great outlay.

As an alternative to this, the flange may be formed on a front side, facing toward the front wall, of a rotor body of the rotor. The flange is then not situated on the fan impeller, which may likewise be mounted on the front side of the rotor body, but is provided directly on the rotor body. In this case, the flange may be formed integrally on the rotor body, whereby said rotor body performs an additional function. As an alternative to this, the flange may be a separate component with respect to the rotor body and mounted in a suitable manner on the rotor body. For example, the flange may be welded, that is to say cohesively connected, to the rotor body. It is likewise conceivable for the flange to be connected in positively locking and/or non-positively locking fashion to the rotor body. For example, the rotor body may be equipped, on its front side, with an axially open, annularly encircling receiving groove into which the flange is inserted axially. The flange is held in positively locking fashion in the receiving groove. The flange is preferably pressed into the receiving groove such that the flange is also held in non-positively locking fashion in the receiving groove.

In another advantageous refinement, the rotor shaft may bear an annular disc on which the flange is formed. In this case, too, an embodiment is preferred in which the flange is formed integrally on said annular disc. An annular disc of said type can be mounted particularly easily onto the rotor shaft in order to realize the flange.

In one refinement, the annular disc may be arranged on the rotor shaft axially between a sealing ring, which has the annular groove, and a rotor body. In this way, said annular disc can be allowed for particularly easily mounting during the assembly of the rotor, specifically during the mounting of the individual rotor components onto the rotor shaft.

In one refinement, on a front side, facing toward the front wall, of the rotor body, there may be formed an annular step into which the annular disc is inserted. This firstly yields particularly secure fixing of the annular disc on the rotor. Secondly, it is also possible for the axial installation space requirement for accommodating the annular disc in the rotor to be reduced by the extent of said annular step.

In another embodiment, the flange may be formed on a sealing ring which has the annular groove and which is mounted onto the rotor shaft. In this way, the sealing ring performs a dual function, as it firstly has the annular groove and secondly has said flange. The structure of the sealing ring is in this case selected such that the annular collar can be inserted axially into an annular chamber which is formed radially between the flange and that surface of the sealing ring in which the annular groove is formed. Here, too, an embodiment is again particularly advantageous in which the flange is formed integrally on the sealing ring. The sealing ring is preferably composed of metal.

In another advantageous embodiment, the surface in which the annular groove is formed and the annular collar and/or the flange that may be provided may be of cylindrical or conical form. In other words, in a profile lying in a longitudinal central plane which has the axis of rotation, the surface in which the annular groove is formed and the annular collar and/or the flange that may be provided extend parallel to the axis of rotation, giving rise to the cylindrical configuration, or with an inclination with respect to the axis of rotation, giving rise to the conical configuration. Regardless of this, it may be provided that said surface, annular collar and the flange that may be provided extend parallel to one another in said profile.

If the electric machine proposed here is designed as a claw pole generator, the abovementioned rotor body is formed by a front claw body. An associated rear claw body then faces toward a rear wall of the housing.

Further important features and advantages of the invention will emerge from the subclaims, from the drawings and from the associated description of the Figures on the basis of the drawings.

It is self-evident that the features mentioned above and the features yet to be discussed below can be used not only in the respectively specified combination but also in other combinations or individually without departing from the scope of the present invention.

Preferred exemplary embodiments of the invention are illustrated in the drawings and will be discussed in more detail in the following description, wherein the same reference signs are used to denote identical or similar or functionally identical components.

BRIEF DESCRIPTION OF THE DRAWINGS

In the Figures, in each case schematically.

DETAILED DESCRIPTION

Figure 1:
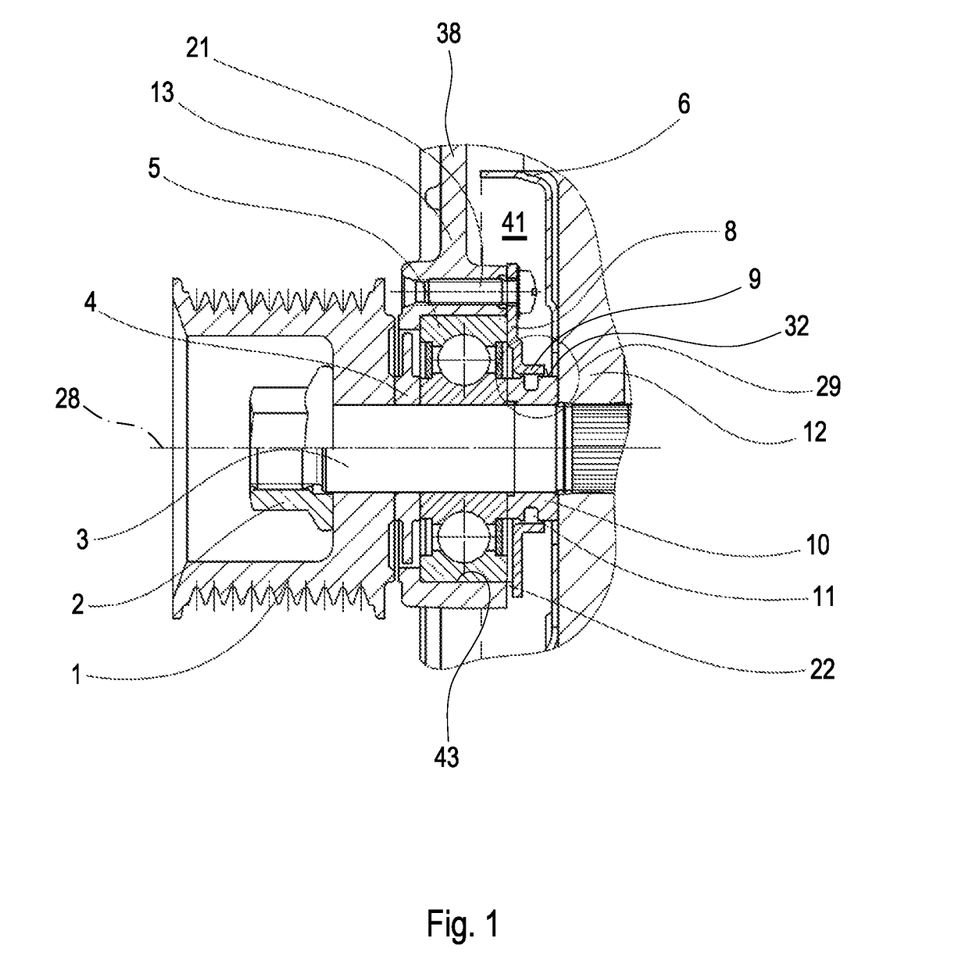
FIG. 1 shows a longitudinal section through an electric machine in the region of a front bearing in the case of a first embodiment.
Figure 2:
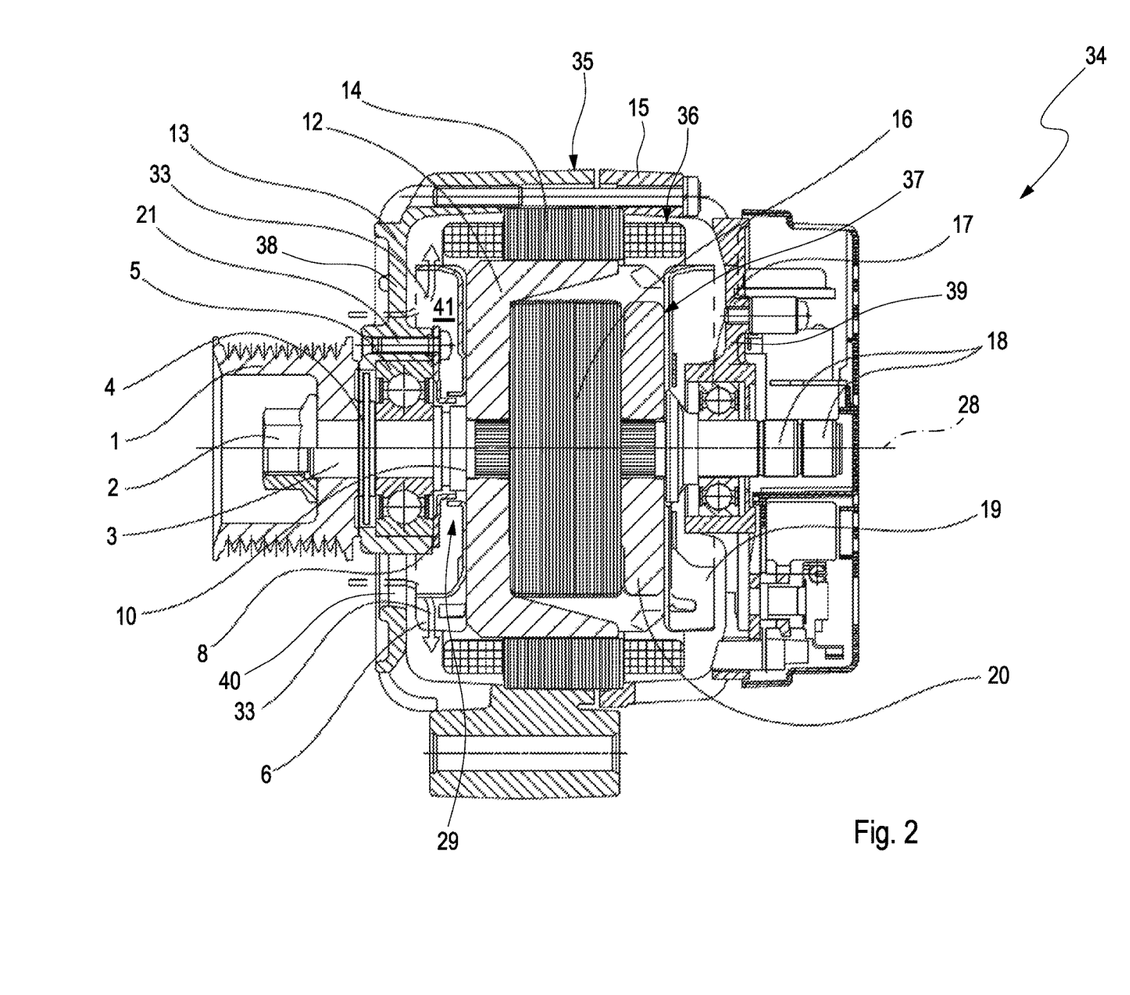
FIG. 2 shows a longitudinal section through the electric machine in the case of the embodiment shown in FIG. 1.

FIG. 2 shows an electric machine 34 which, in the example, is a generator, specifically a claw pole generator. The electric machine 34 is expediently used as an alternator with an internal combustion engine, preferably in a motor vehicle. The electric machine 34 has a housing 35 which, in the example shown, is assembled from a front bracket-shaped part 13 and a rear bracket-shaped part 15. For this purpose, screws are used which are not designated in any more detail. The electric machine 34 furthermore has a stator 36 which is arranged in the housing 35 and which is fixed with respect to the housing. A stator winding is in this case denoted by 14. Furthermore, there is arranged in the stator 36 a rotor 37 which is mounted on the housing 35 so as to be rotatable about an axis of rotation 28. Said axis of rotation 28 defines an axial direction of the machine 34. In the example shown, the rotor 37 comprises a front claw body 12 and a rear claw body 20. A rotor winding 16 is arranged between the claw bodies 12, 20.

The rotor 37 furthermore has a rotor shaft 3. The latter is led out of the housing 35 through a front wall 38 of the housing 35. In this case, the front wall 38 belongs to the front bracket-shaped part 13. The rotor shaft 3 has a drive element 1 on the outer side, averted from the housing interior, of the front wall 38. When the machine 34 is incorporated into a drivetrain (not shown here), this is realized by way of the drive element 1. The drive element 1 then serves for transmission of torque between the rotor 37 and said drivetrain. In the example of FIG. 2, the drive element 1 is in the form of a belt pulley, such that the electric machine 34 can be incorporated for example into a belt drive of an internal combustion engine.

The rotor shaft 3 is furthermore rotatably mounted in a front bearing 5 which, for this purpose, is inserted into the front wall 38. Analogously to this, the rotor shaft 3 is furthermore rotatably mounted by way of a rear bearing 17 which is inserted into a rear wall 39 is situated opposite the front wall 38. Said rear wall 39 is in this case formed on the rear bracket-shaped part 15.

Further components of the machine 34 that are visible in FIG. 2 are for example a protective disc 4, which, at the outer side of the front wall 38, is arranged on the rotor shaft 3 axially between the front bearing 5 and the drive element 1. The individual components of the rotor 37 which are mounted onto the rotor shaft 3 are braced together axially by way of a nut 2 and are thereby connected rotationally conjointly to one another and to the rotor shaft 3. To the front claw body 12 there is fixed a front fan impeller 6 which, when the rotor 3 is in rotation, generates a cooling air flow 33 which is drawn into an interior 41 of the housing 35 from the surroundings of the machine 34 through corresponding openings 40 which are cut out of the front wall 38 for this purpose. Analogously to this, a rear fan impeller 19 may be fixed to the rear claw body 20, which rear fan impeller generates a further cooling air flow, which is however not indicated here. The rotor shaft 3 has, at its end region averted from the drive element 1, two slip rings 18 via which electrical contacting of the rotor winding 16 is realized.

In the machine 34 proposed here, a labyrinth seal 29 is furthermore provided which, at an inner side of the front wall 38, seals off the front bearing 5 with respect to the interior 41. Said labyrinth seal 29 will be discussed in more detail below on the basis of FIGS. 1 and 3-11.

In FIGS. 1 and 3-9, the labyrinth seal 29 has an annular groove 11 which is arranged on the rotor shaft 3 and which is radially open. The radial direction is in this case in relation to the axis of rotation 28. Furthermore, the labyrinth seal 29 comprises a ring shaped holding plate 8 which is arranged on an inner side, facing toward the housing interior, of the front side wall 38 and which has an annular collar 9 which protrudes inwardly, that is to say in the direction of the rear side wall 39. Said annular collar 9 is then positioned and arranged so as to axially fully overlap the annular groove 11. However, there is no contact between said annular collar 9, which is fixed to the housing, and the annular groove 11, which is fixed to the rotor, or between said annular collar 9 and a surface 32 in which the annular groove 11 is situated. Rather, an inner annular gap S2 is formed between the surface 32, which comprises the annular groove 11, and the annular collar 9. The inner annular gap S2 is denoted in FIGS. 3, 10 and 11. Here, the inner annular gap S2 is illustrated such that "S2" simultaneously denotes a radially measured gap width of said inner annular gap S2.

Furthermore, in the embodiments shown here, it is provided that the annular groove 11 is formed in a sealing ring 10 which, in the form of a separate component, is mounted onto the rotor shaft 3. The abovementioned surface 32 in which the annular groove 11 is situated is thus formed by the surface of said sealing ring 10, which is accordingly likewise denoted by 32.

In the examples shown here, the holding plate 8 is screwed to the front wall 38 by way of at least one screw 21. Here, said holding plate 8 furthermore serves for realizing axial fixing of the front bearing 5 to the front wall 38. To this end the front bearing 5 abuts axially on the holding plate 8 in the area of the respective screw 21. Adjacent to the respective screw 21 the holding plate 8 is displaced from the front bearing 5 such that an axial gap 22 is provided between the holding plate 8 and the front bearing 5. This gap 22 operates as air gap insulation in order to reduce thermal stress of the front bearing 5.

The front bearing 5 is inserted axially into a bearing receptacle 43 which is formed on the front wall 38 at the inner side thereof. The holding plate 8 then engages over said bearing receptacle 43 at the edges in a radial direction, whereby the front bearing 5 inserted therein is fixed axially.

Figure 3:
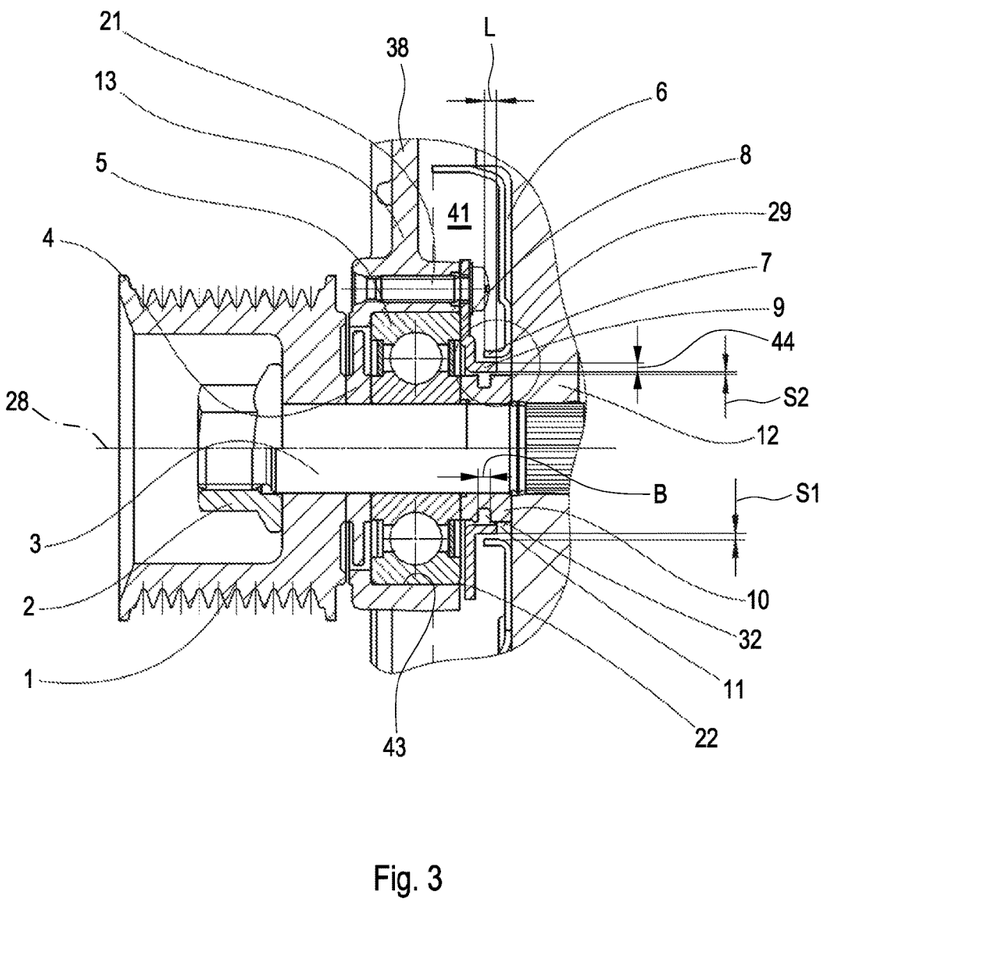
FIG. 3 shows a longitudinal section similar to that in FIG. 1 in the region of the front bearing, but in the case of a further embodiment, FIGS. 4-11 each show a longitudinal section in the region of a part of the front bearing in the case of various other embodiments.
Figure 10:
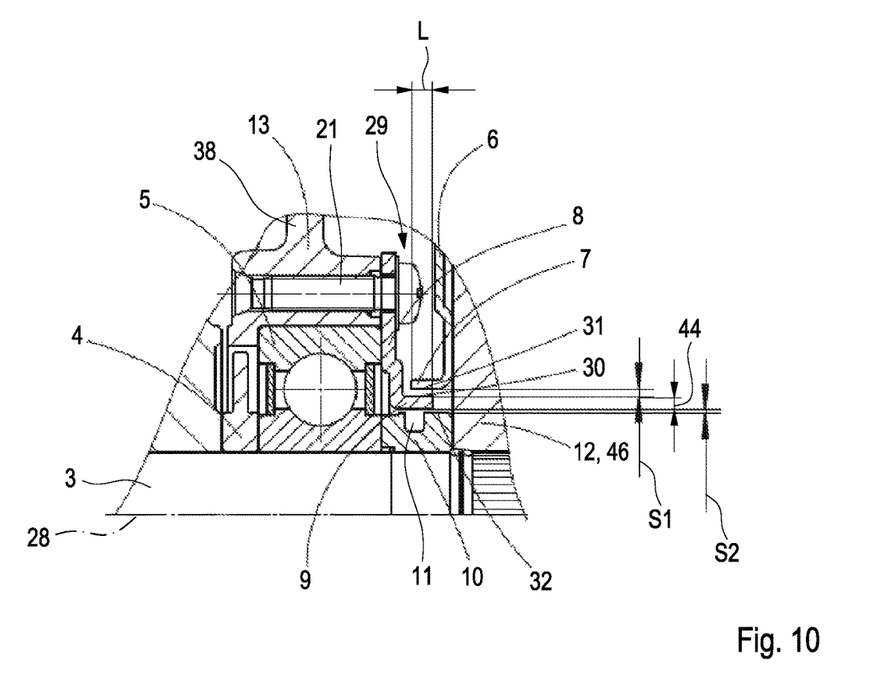
Figure 11:
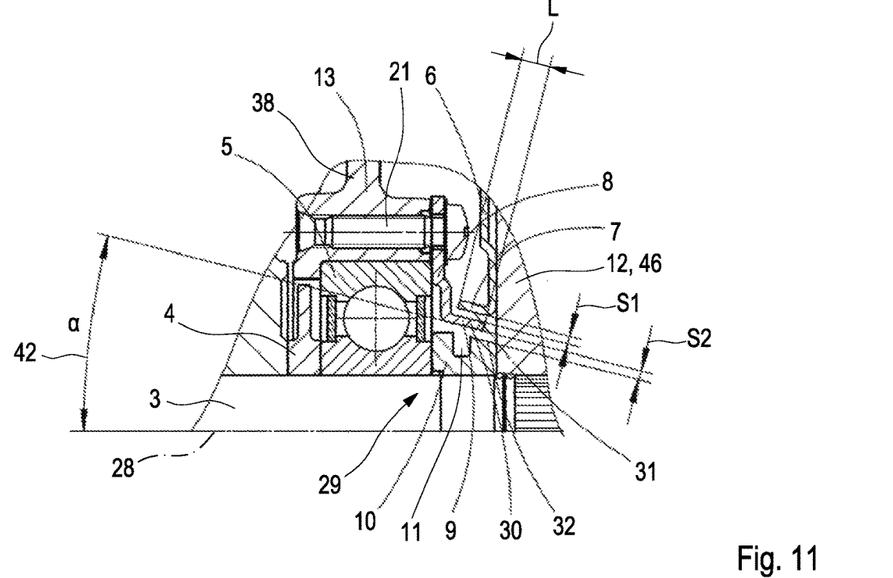

In the embodiments shown in FIGS. 3-9, the labyrinth seal 29 is additionally equipped with an annularly encircling flange 7 which is arranged on the rotor 3 and which protrudes outwardly, that is to say in the direction of the front wall 38. Said flange 7 axially overlaps the annular collar 9, at a side averted from the annular groove 11, specifically over a length L. Furthermore, an outer annular gap S1, indicated in FIGS. 3, 10 and 11, is formed between the flange 7 and the annular collar 9. Here, the outer annular gap S1 is illustrated such that "S1" simultaneously denotes a radially measured gap width of said outer annular gap S1.

As can be seen, the outer annular gap S1, measured radially, is larger than the inner annular gap S2. The outer annular gap S1 is expediently at least twice as large in the radial direction as the inner annular gap S2. Furthermore, the outer annular gap S1 is preferably smaller in the radial direction than a wall thickness, denoted by 44 in FIGS. 3 and 10, of the annular collar 9. Furthermore, the length L of the abovementioned axial overlap between the flange 7 and annular collar 9 is larger than the wall thickness 44 of the annular collar 9. Furthermore, the length L of said axial overlap is at least equal to an axial width B of the annular groove 11, as indicated in FIG. 3.

In the embodiment shown in FIG. 3, the flange 7 is formed integrally on the front fan impeller 6.

Figure 4:
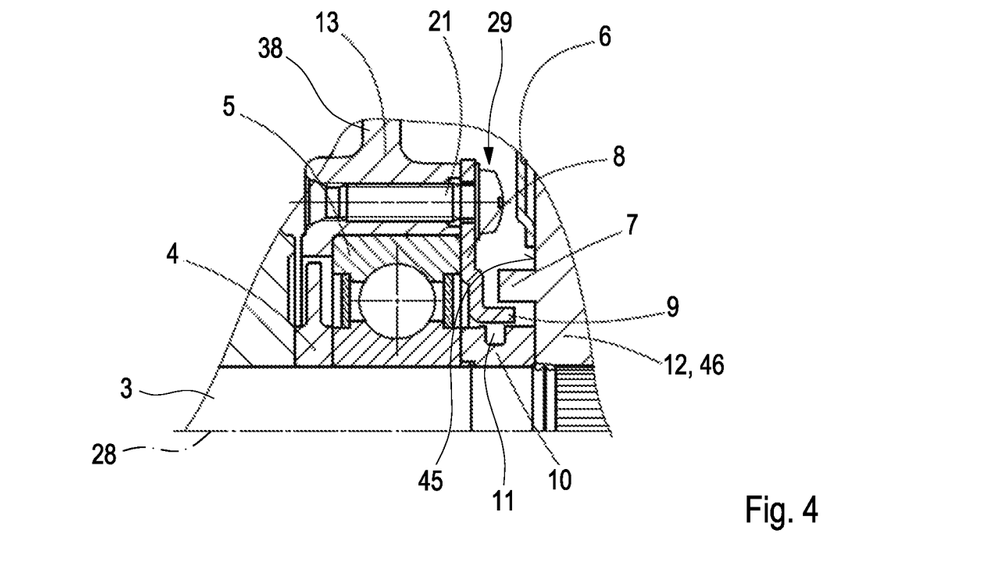
Figure 5:
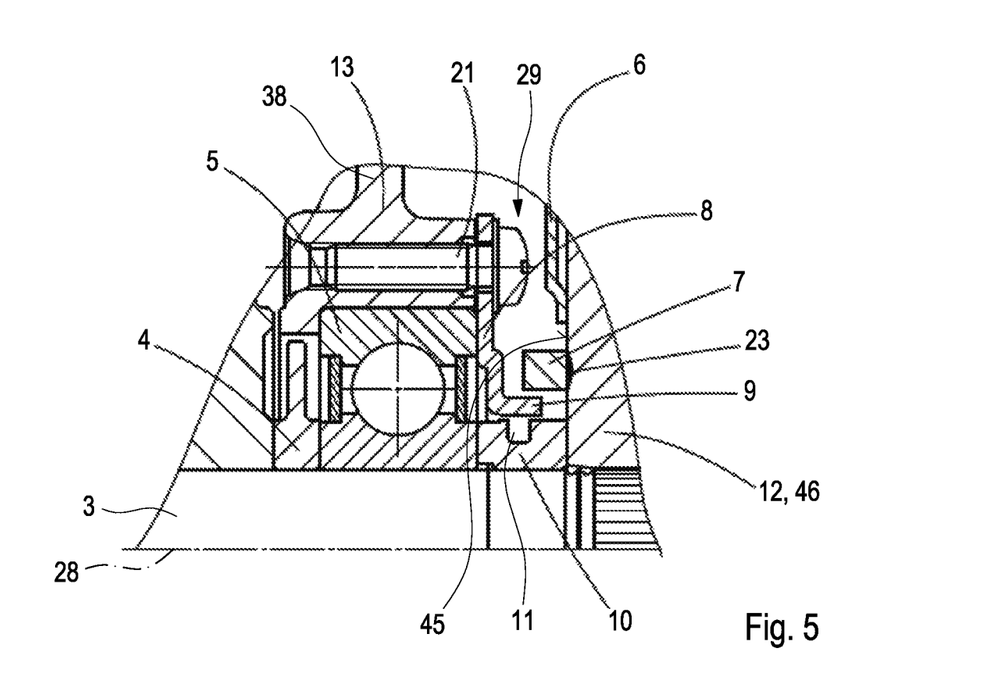
Figure 6:
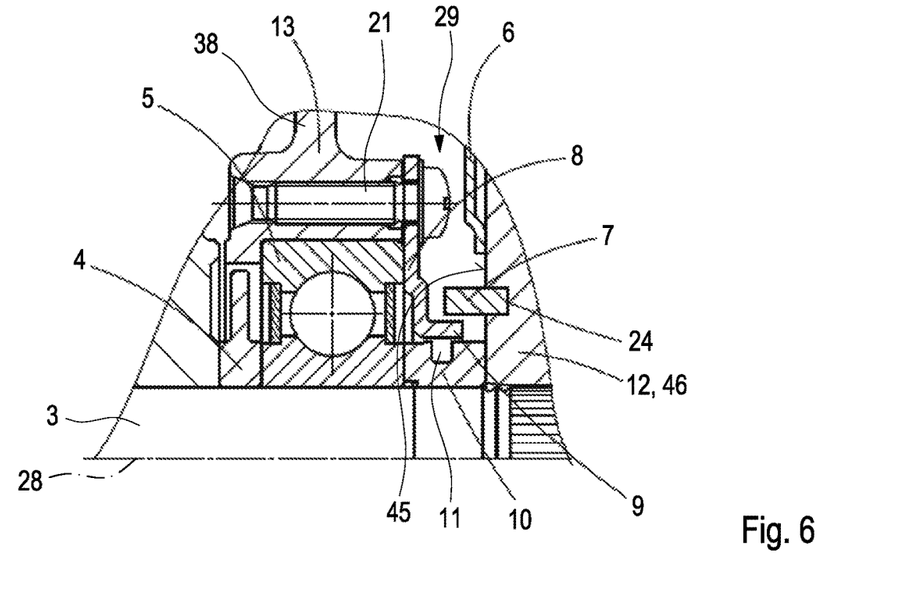

In the embodiments of FIGS. 4-6, the flange 7 is formed on a front side 45, facing toward the front wall 38, of a rotor body 46. Said rotor body 46 is, in the embodiments shown here, formed by the front claw body 12. In the example shown in FIG. 4, the flange 7 is formed integrally on the rotor body 46 or on the front claw body 12. By contrast to this, in the examples of FIGS. 5 and 6, said flange 7 is a separate component with respect to the rotor body 46, said separate component being suitably mounted on the rotor body 46. In the example of FIG. 5, the flange 7 is fastened to the rotor body 46 by way of a fixing point 23. Such a fixing point 23 can be made by an adhesive connection or by way of a brazed or welded connection. In the embodiment shown in FIG. 6, a receiving groove 24 is formed on the front side 45 of the rotor body 46, said receiving groove being of annularly encircling form and axially open. The separate flange 7 is inserted axially into said receiving groove 24. The flange 7 may be held in the receiving groove 24 by way of an interference fit. It is likewise conceivable for the flange 7 in the receiving groove 24 to be fixed to the rotor body 46 by way of an adhesive connection and/or by way of a brazed connection.

Figure 7:
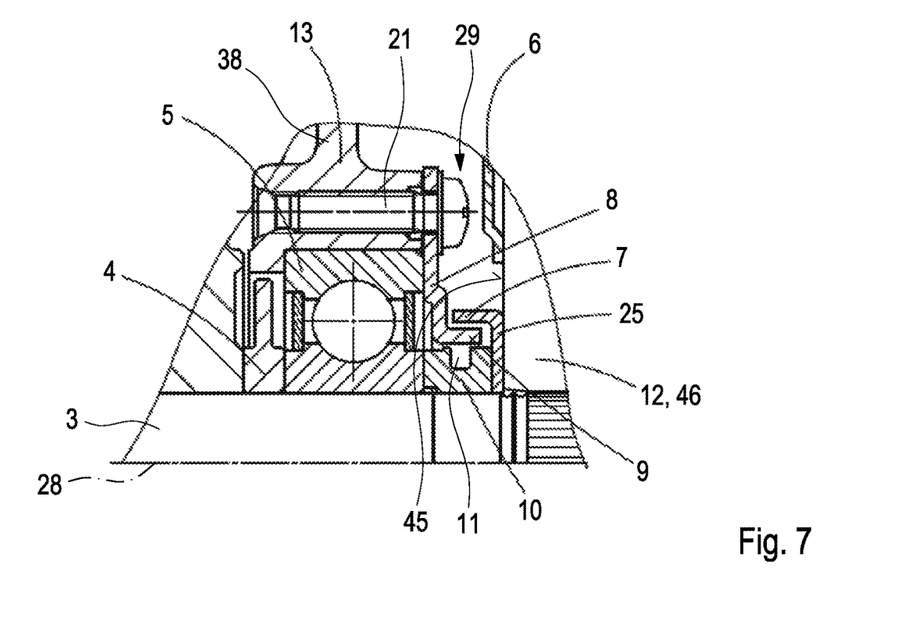
Figure 8:
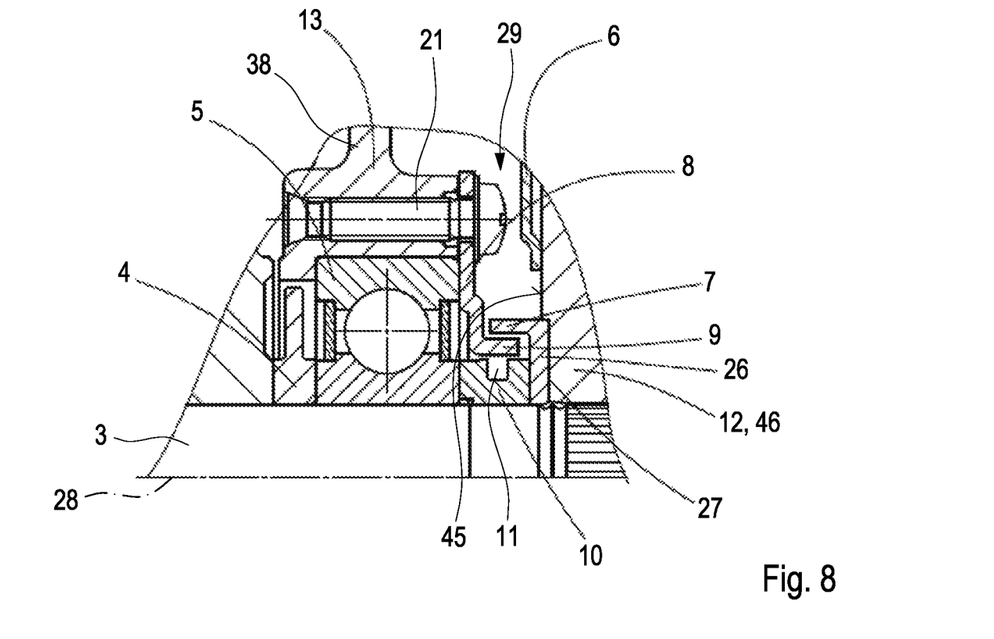

In the embodiments of FIGS. 7 and 8, to realize the flange 7, an additional annular disc is provided which is denoted by 25 in FIG. 7 and by 26 in FIG. 8, said additional annular disc being mounted on the rotor shaft 3 and having the flange 7 formed thereon. In the example shown, the flange 7 is formed integrally on the annular disc 25 and 26 respectively. The annular disc 25 or 26 respectively is arranged on the rotor shaft 3 axially between the sealing ring 10, which has the annular groove 11, and the rotor body 46.

In the refinement shown in FIG. 8, an annular step 27 is formed on the front side 45 of the rotor body 46. The annular disc 26 is inserted axially into said annular step 27.

Figure 9:
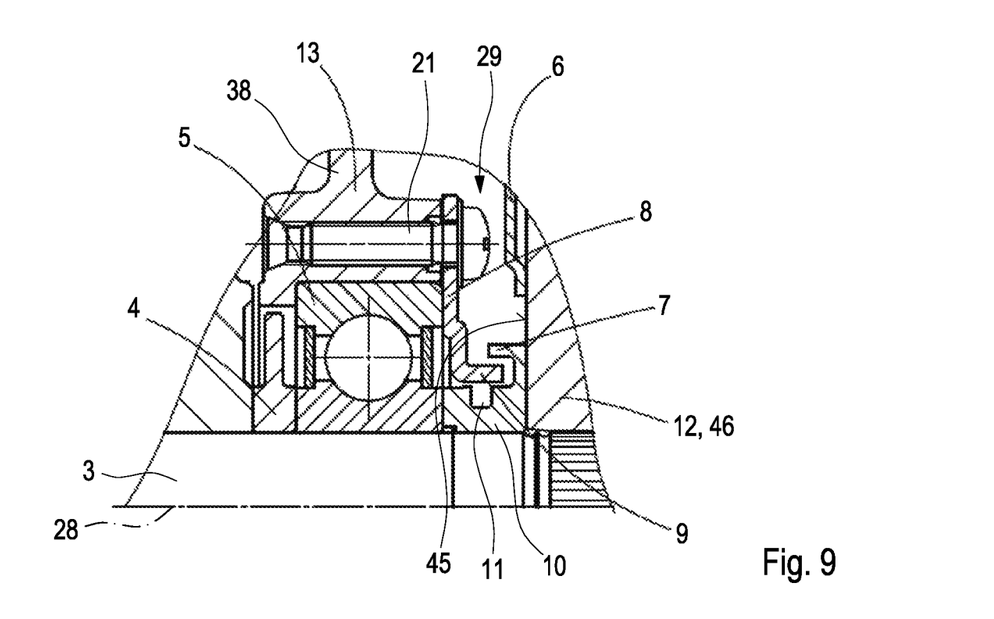

In the embodiment shown in FIG. 9, it is then provided that the flange 7 is formed on the sealing ring 10. It is again preferable here for the flange 7 to be formed integrally on the sealing ring 10. The sealing ring 10 thus has a radially open receiving groove, which forms the annular groove 11, and an axial groove which is open toward the front bearing 5, the radially outer delimiting wall of which axial groove forms the flange 7. The annular collar 9 engages axially into said axial groove.

The embodiment shown in FIG. 10 corresponds to the embodiment shown in FIG. 3. The following statements however apply to all of the embodiments of FIGS. 2-10 and, aside from the flange 7, also to the embodiment of FIG. 1. As can be seen, it is specifically provided in an advantageous embodiment that the surface 32 in which the annular groove 11 is situated and the annular collar 9 and the flange 7 are of cylindrical form. Consequently, in a profile of the labyrinth seal 29, the surface 32 in which the annular groove 11 is situated and the annular collar 9, or an outer wall 30 of the annular collar 9, and the flange 7, or an inner wall 31 of the flange 7, extend parallel to the axis of rotation 28 and furthermore parallel to one another.

By contrast to this, FIG. 11 shows an embodiment in which the surface 32, the annular collar 9 and the flange 7 are each of conical form. Consequently, in the profile of the labyrinth seal 29, the surface 32 and the annular collar 9, or the outer wall 30 thereof, and the flange 7, or the inner wall 31, extend in inclined fashion with respect to the axis of rotation 28. A corresponding angle of inclination is denoted by 42 or by "alpha". Furthermore, in this case, too, in this profile, the surface 32, the annular collar 9 and the flange 7 extend parallel to one another. Here, the respective profile which has been described above with reference to FIGS. 10 and 11 lies in a section plane or in a longitudinal central plane in which the axis of rotation 28 also lies.

The invention claimed is:
1. An electric machine comprising:
a housing,
a stator arranged in the housing,
a rotor which is arranged in the stator and which is mounted on the housing so as to be rotatable about an axis of rotation,
wherein the rotor has a rotor shaft which is led out through a front wall of the housing,
wherein the rotor shaft has, on an outer side of the front wall, a drive element which serves for transmission of torque between the rotor and a drivetrain,
wherein the rotor shaft is rotatably mounted in a front bearing which is inserted into the front wall,
wherein the front bearing is, at an inner side of the front wall, sealed off with respect to an interior of the housing by way of a labyrinth seal,
wherein the labyrinth seal has an annular groove which is arranged on the rotor shaft and which is radially open,
wherein the labyrinth seal has a holding plate which is arranged on the inner side of the front wall and which has an annular collar inwardly protruding toward the rotor,
wherein the annular collar axially overlaps the annular groove, and
wherein an inner annular gap is formed between a surface in which the annular groove is situated and the annular collar.

2. An electric machine according to claim 1, wherein the annular groove is formed in a sealing ring which is mounted onto the rotor shaft.

3. An electric machine according to claim 1, wherein the holding plate axially fixes the front bearing to the front wall.

4. An electric machine according to claim 1, wherein:
the labyrinth seal has an annularly encircling flange which is formed on the rotor and which protrudes outwardly toward the front bearing,
the flange axially overlaps the annular collar, at a side averted from the annular groove, over a length, and
an outer annular gap is formed between the flange and the annular collar.

5. An electric machine according to claim 4, wherein at least one of:
the outer annular gap is larger than the inner annular gap, and
the outer annular gap is smaller than a wall thickness of the annular collar.

6. An electric machine according to claim 4, wherein at least one of:
the length of the overlap is larger than a wall thickness of the annular collar, and
the length of the overlap is at least equal to an axial width of the annular groove.

7. An electric machine according to claim 4, wherein:
the rotor has, on a front side facing toward the front wall, a front fan impeller fixed to the rotor, and
the flange is formed on the front fan impeller.

8. An electric machine according to claim 4, wherein the surface in which the annular groove is formed and at least one of the annular collar and the flange is of cylindrical or conical form.

9. An electric machine according to claim 4, wherein the outer annular gap is at least twice as large as the inner annular gap.

10. An electric machine comprising:
a housing,
a stator arranged in the housing,
a rotor which is arranged in the stator and which is mounted on the housing so as to be rotatable about an axis of rotation,
wherein the rotor has a rotor shaft which is led out through a front wall of the housing,
wherein the rotor shaft has, on an outer side of the front wall, a drive element which serves for transmission of torque between the rotor and a drivetrain,
wherein the rotor shaft is rotatably mounted in a front bearing which is inserted into the front wall,
wherein the front bearing is, at an inner side of the front wall, sealed off with respect to an interior of the housing by way of a labyrinth seal,
wherein the labyrinth seal has an annular groove which is arranged on the rotor shaft and which is radially open,
wherein the labyrinth seal has a holding plate which is arranged on the inner side of the front wall and which has an annular collar inwardly protruding toward the rotor,
wherein the annular collar axially overlaps the annular groove, and
wherein an inner annular gap is formed between a surface in which the annular groove is situated and the annular collar,
wherein the labyrinth seal has an annularly encircling flange which is formed on the rotor and which protrudes outwardly toward the front bearing,
wherein the flange axially overlaps the annular collar, and
wherein an outer annular gap is formed between the flange and the annular collar.

11. An electric machine according to claim 10, wherein at least one of:
the outer annular gap is larger than the inner annular gap, and
the outer annular gap is smaller than a wall thickness of the annular collar.

12. An electric machine according to claim 10, wherein at least one of:
the length of the overlap is larger than a wall thickness of the annular collar, and
the length of the overlap is at least equal to an axial width of the annular groove.

13. An electric machine according to claim 10, wherein:
the rotor has, on a front side facing toward the front wall, a front fan impeller fixed to the rotor, and
the flange is formed on the front fan impeller.

14. An electric machine comprising:
a housing comprising a front wall;
a front bearing inserted into the front wall;
a stator arranged in the housing;
a rotor arranged in the stator and rotatably mounted to the housing and comprising a rotor shaft extending through the front wall;
wherein the rotor shaft comprises, on an outer side of the front wall, a drive element configured to transmit torque between the rotor and a drivetrain;
wherein the rotor shaft is rotatably mounted in the front bearing;
wherein the front bearing is, at an inner side of the front wall, sealed off with respect to an interior of the housing by way of a labyrinth seal comprising:
a radially open annular groove arranged on the rotor shaft; and
a holding plate arranged on the inner side of the front wall and having an annular collar inwardly protruding toward the rotor;
wherein the annular collar axially overlaps the annular groove; and
wherein an inner annular gap is formed between a surface in which the annular groove is situated and the annular collar.

15. An electric machine according to claim 14, wherein the annular groove is formed in a sealing ring which is mounted onto the rotor shaft.

16. An electric machine according to claim 14, wherein the holding plate axially fixes the front bearing to the front wall.

17. An electric machine according to claim 14, wherein:
the labyrinth seal has an annularly encircling flange which is formed on the rotor and which protrudes outwardly toward the front bearing;
the flange axially overlaps the annular collar, at a side averted from the annular groove, over a length; and
an outer annular gap is formed between the flange and the annular collar.

18. An electric machine according to claim 17, wherein at least one of:
the outer annular gap is larger than the inner annular gap, and
the outer annular gap is smaller than a wall thickness of the annular collar.

19. An electric machine according to claim 17, wherein at least one of:
the length of the overlap is larger than a wall thickness of the annular collar, and the length of the overlap is at least equal to an axial width of the annular groove.

20. An electric machine according to claim 17, wherein:
the rotor has, on a front side facing toward the front wall,
a front fan impeller fixed to the rotor, and
the flange is formed on the front fan impeller.

\* \* \* \* \*